United States Patent
Kennedy

(10) Patent No.: US 6,985,808 B1
(45) Date of Patent: Jan. 10, 2006

(54) TRANSIENT COMPENSATION OF EGR AND BOOST IN AN ENGINE USING ACCELERATOR PEDAL RATE DATA

(75) Inventor: Michael P. Kennedy, Wheaton, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 22 days.

(21) Appl. No.: 10/939,741

(22) Filed: Sep. 13, 2004

(51) Int. Cl.
F02D 41/04 (2006.01)
F02D 43/04 (2006.01)

(52) U.S. Cl. .................. 701/108; 701/115; 60/605.2; 60/611; 123/568.21

(58) Field of Classification Search ................ None
See application file for complete search history.

(56) References Cited

U.S. PATENT DOCUMENTS 4,173,205 A * 11/1979 Toelle ............... 123/568.22
5,579,743 A * 12/1996 Kadowaki ............ 123/568.24

* cited by examiner

Primary Examiner—Andrew M. Dolinar
(74) Attorney, Agent, or Firm—Dennis Kelly Sullivan; Susan L. Lukasik; Jeffrey P. Calfa

(57) ABSTRACT

An internal combustion engine (10) has a control system (24) for processing various data to develop data for control of various aspects of engine operation, including controlling a device, such as an EGR valve (22) or turbocharger (16). A transient compensation strategy develops a multiplier data value for transient compensation of a control data value for controlling the device by multiplying that control data value by that multiplier data value. The transient compensation strategy comprises a map (34, 40) containing data values for the multiplier, each of which is correlated with both a particular data value for engine speed within a range of data values for engine speed (N) and a particular data value for accelerator pedal rate (APS_d) within a range of data values for accelerator pedal rate. The strategy selects one of the multiplier data values from the map on the basis of a data value for engine speed and of a data value for accelerator pedal rate and then multiplies the control data value for controlling the device by the one selected multiplier data value.

24 Claims, 4 Drawing Sheets

TRANSIENT COMPENSATION OF EGR AND BOOST IN AN ENGINE USING ACCELERATOR PEDAL RATE DATA

FIELD OF THE INVENTION

This invention relates to internal combustion engines for propelling motor vehicles, and more particularly to a strategy that improves control of EGR (exhaust gas recirculation) and turbocharger boost during certain transient conditions.

BACKGROUND OF THE INVENTION

Electronic controls enable motor vehicle engines to operate in ways that accomplish multiple goals, such as improving vehicle driveability, increasing fuel mileage, and lowering tailpipe emissions. For any of various reasons, an engine will experience transient operation while in use. Some transients are less severe, others more severe.

Transients, especially severe ones, can upset desired engine control strategy, leading to undesired effects such as engine stumbling and the generation of increased amounts of certain tailpipe emissions. Consequently, engine control strategies typically take transients into account in some way.

One way in which an engine transient can arise is by operation of the accelerator pedal. If the accelerator is rapidly depressed, the driver is typically calling for increased engine torque to accelerate the engine and/or prevent the engine from decelerating in response to an increase in engine load. When it is desired to slow a motor vehicle being propelled by an internal combustion engine, the driver typically releases the accelerator pedal. That action alone will cause the vehicle to slow due to various forces acting on the vehicle. Driver action may also include applying the vehicle service brakes, depending on the amount of braking needed.

During such transients, certain variable parameters related to engine operation experience transients themselves, including EGR rate, and in the case of a turbocharged engine, turbocharger boost.

SUMMARY OF THE INVENTION

Accordingly, one generic aspect of the present invention relates to an internal combustion engine comprising a control system comprising a processor for processing various data to develop data for control of various aspects of engine operation, including controlling a device that controls flow of a gaseous fluid into the engine.

The processor processes certain data according to a transient compensation strategy to develop a multiplier data value for transient compensation of a control data value for controlling the device by multiplying that control data value by that multiplier data value. The transient compensation strategy comprises a map containing data values for the multiplier, each of which is correlated with both a particular data value for engine speed within a range of data values for engine speed and a particular data value for accelerator pedal rate within a range of data values for accelerator pedal rate. The processor selects one of the multiplier data values from the map on the basis of a data value for engine speed and of a data value for accelerator pedal rate and then multiplies the control data value for controlling the device by the one selected multiplier data value.

Another aspect of the invention relates to the control system just described.

Still another aspect relates to a method for transient control of a device that controls flow of a gaseous fluid into an internal combustion engine as embodied in an engine as just described.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
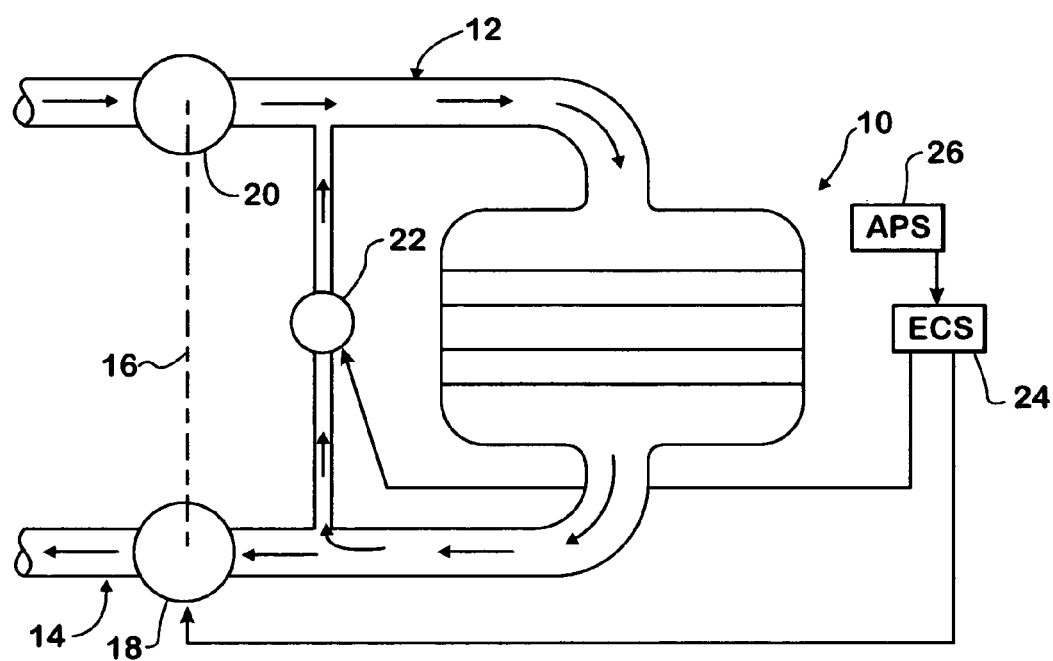
FIG. 1 is a pictorial diagram of portions of an exemplary internal combustion engine in a motor vehicle relating to the present invention.

FIG. 1 shows portions of an exemplary internal combustion engine 10 useful in explaining principles of the present invention. Engine 10 has an intake system 12 through which air for combustion enters the engine and an exhaust system 14 through which exhaust gases resulting from combustion exit the engine. Engine 10 is, by way of example, a diesel engine that comprises a turbocharger 16. When used in a motor vehicle, such as a truck, engine 10 is coupled through a drivetrain to driven wheels that propel the vehicle.

Engine 10 comprises multiple cylinders forming combustion chambers into which fuel is injected by fuel injectors to mix with charge air that has entered through the intake system. Reciprocating pistons compress the mixtures in the cylinders forcing combustion as the engine cycle for each cylinder passes from its compression phase to its power phase. The pistons are coupled via connecting rods to drive a crankshaft, which in turn delivers torque through the drivetrain to the driven wheels that propel the vehicle. Gases resulting from combustion are exhausted through exhaust system 14.

A turbine 18 of turbocharger 16 is in the path of exhaust gases passing through exhaust system 14. The exhaust gas flow powers turbine 18 to drive a compressor 20 of turbocharger 16 in intake system 12 thereby providing boost.

An exhaust gas recirculation (EGR) valve 22 provides for a portion of the exhaust gases to be recirculated from exhaust system 14 to intake system 12 for emission control.

Engine 10 comprises an engine control system (ECS) 24 that comprises one or more processors that process various data to develop data for controlling various aspects of engine operation including control of engine fueling, turbocharger boost, and EGR. Hence ECS 24 provides control of turbocharger 16 and EGR valve 22. The data that is processed by ECS 24 may originate at external sources or be obtained internally of ECS 24 either on a data bus or by processing. An example of data that is internally published on a data bus is engine speed. An example of data that is obtained from an external source is accelerator pedal position, as obtained from an accelerator position sensor, or APS, 26. Both engine speed data and accelerator position data are used in the inventive transient compensation strategy.

Figure 2:
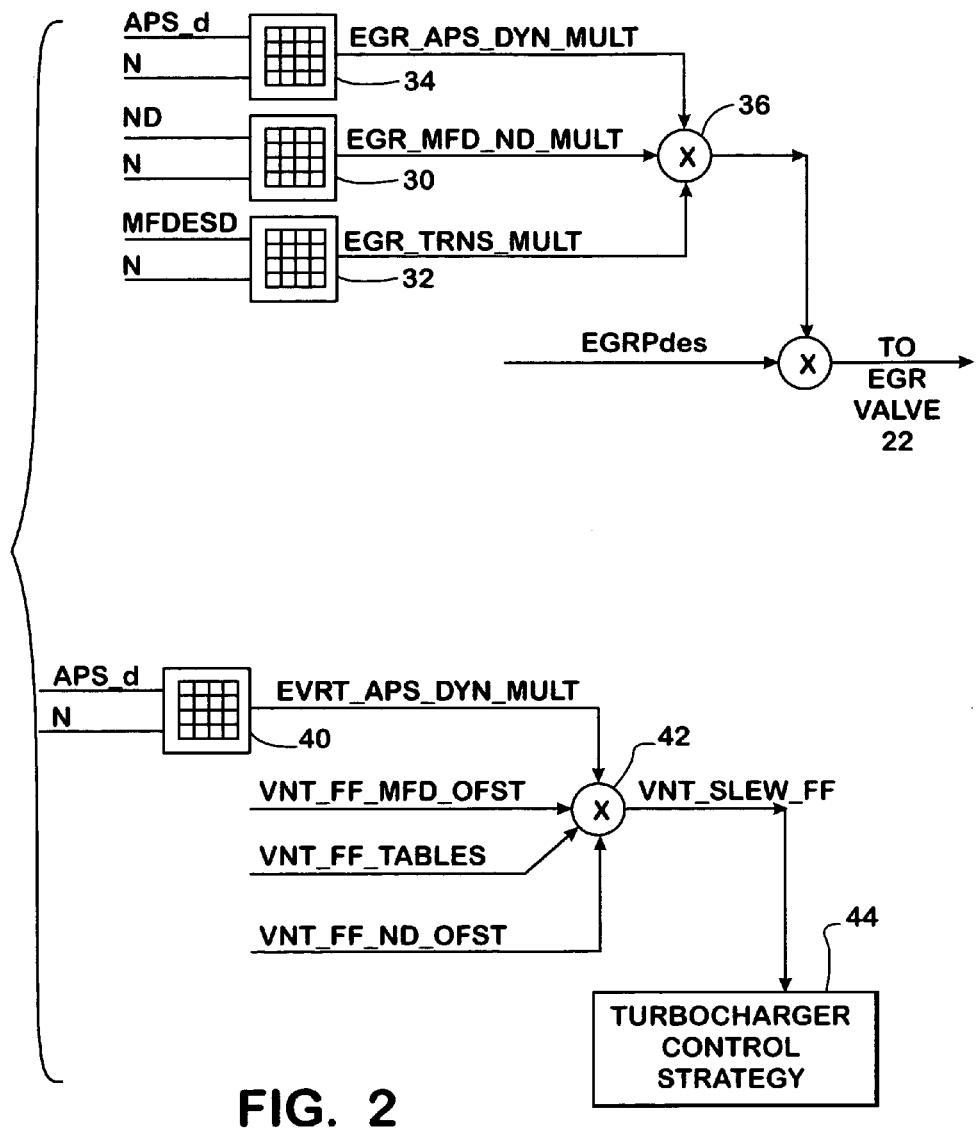
FIG. 2 is a schematic software strategy diagram that includes an exemplary embodiment of transient compensation strategy, including the improvement provided by the present invention, as embodied in an engine control system.

Principles of the inventive strategy and its implementation in the engine control strategy that is performed by ECS 24 are disclosed in FIG. 2. The strategy is performed by the repeated execution of algorithms by a processor, or processors, of ECS 24. The strategy is part of a more general strategy referred to as Transient Engine Load Detection, which is one of several strategies that modify what can be considered as "desired" values for turbocharger boost and for exhaust gas recirculation. "Desired" values are calculated by basic control algorithms for essentially steady state conditions, but they require modification, or compensation, to account for variables, such as, for example, barometric pressure, ambient temperature, and engine temperature, and for transients, such as changes in engine load.

The Transient Engine Load Detection Strategy as applied to control of EGR valve 22 comprises several maps. A first map 30 contains data values for a first multiplier, each of which is correlated with both a data value for rate of change in engine speed (i.e., engine acceleration/deceleration) falling within a particular range of engine acceleration/deceleration and a data value for engine speed falling within a particular range of engine speeds.

A second map 32 contains data values for a second multiplier, each of which is correlated with both a data value for rate of change in engine fueling falling within a particular range of rate of change in engine fueling and a data value for engine speed falling within a particular range of engine speeds.

The improvement provided by the invention is a third map 34 that contains data values for a third multiplier, each of which is correlated with both a particular data value for engine speed within a particular range of data values for engine speed and a particular data value for accelerator pedal rate within a particular range of data values for accelerator pedal rate.

A data value for accelerator pedal rate is obtained by processing data from APS 26 to develop a data value for a parameter APS_d. Engine speed data is represented by a parameter N.

A data value for engine acceleration/deceleration is obtained by processing engine speed N to yield its time derivative, designated by a parameter ND. A data value for rate of change in engine fueling is obtained by processing engine fueling rate data to yield its time derivative, designated by a parameter MFDESD.

Data values for APS_d and N applied to map 34 yield a data value for the multiplier designated by a parameter EGR_APS_DYN_MULT. Data values for ND and N applied to map 30 yield a data value for the multiplier designated by a parameter EGR_MFD_ND_MULT. Data values for MFDESD and N applied to map 32 yield a data value for the multiplier designated by a parameter EGR_TRANS_MULT.

The selected data values for EGR_APS_DYN_MULT, EGR_MFD_ND_MULT, and EGR_TRANS_MULT can be multiplied together, reference numeral 36, before being used to modify the "desired" data value for EGR, represented by a parameter EGRPdes, to set the amount to which EGR valve 22 is open. And although not shown in the drawing, other modification or compensation of EGRPdes may be present.

The inclusion of map 34 provides generally better EGR control and better EGR control calibration optimization. By taking accelerator pedal rate into account based on engine speed, EGR valve 22 can be more rapidly closed in anticipation of aggressive engine accelerations, particularly (although not necessarily only) at lower engine speeds. This is helpful in avoiding engine stumble and reducing engine smoke.

Typically the multipliers in each map will have a value spanning a range from 0 to 1, inclusive. Actual data values can be determined by calculation, by actual testing, and/or a combination of both.

The Transient Engine Load Detection Strategy as applied to control of turbocharger 16 also comprises a map 40 similar to map 34 in that map 40 contains data values for a multiplier, each of which is correlated with both a particular data value for engine speed within a particular range of data values for engine speed and a particular data value for accelerator pedal rate within a particular range of data values for accelerator pedal rate.

Data values for APS_d and N applied to map 40 yield a data value for the multiplier designated by a parameter EVRT_APS_DYN_MULT, which is shown as one of several multipliers used to modify (reference numeral 42) a "desired" data value used in control of turbocharger speed. The other multipliers are designated by parameters VNT_FF_MFD_OFST and VNT_FF_ND_OFST. The particular "desired" data value being modified is designated by a parameter VNT_FF_TABLES, and it functions as a feed-forward component of a turbocharger control strategy 44 that also includes a feedback component.

The inclusion of map 40 provides generally better control of boost. By taking accelerator pedal rate into account based on engine speed, boost can be more rapidly adjusted in anticipation of aggressive engine operations.

Typically the multipliers in map 40 will have a value spanning a range from 0 to 1, inclusive. Actual data values can be determined by calculation, by actual testing, and/or a combination of both.

Figure 3:
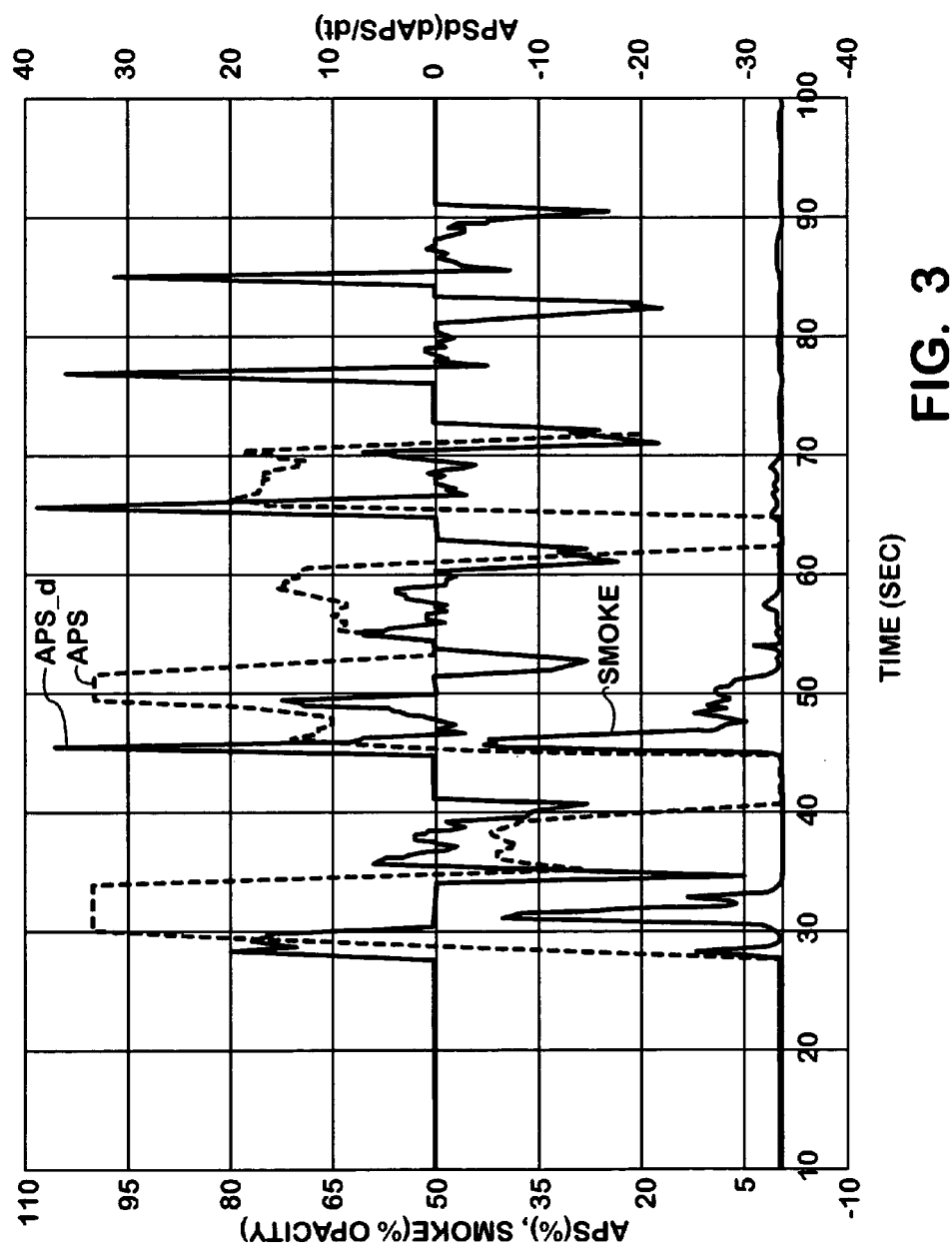
FIG. 3 is a graph showing several time traces useful in showing effectiveness of the invention.
Figure 4:
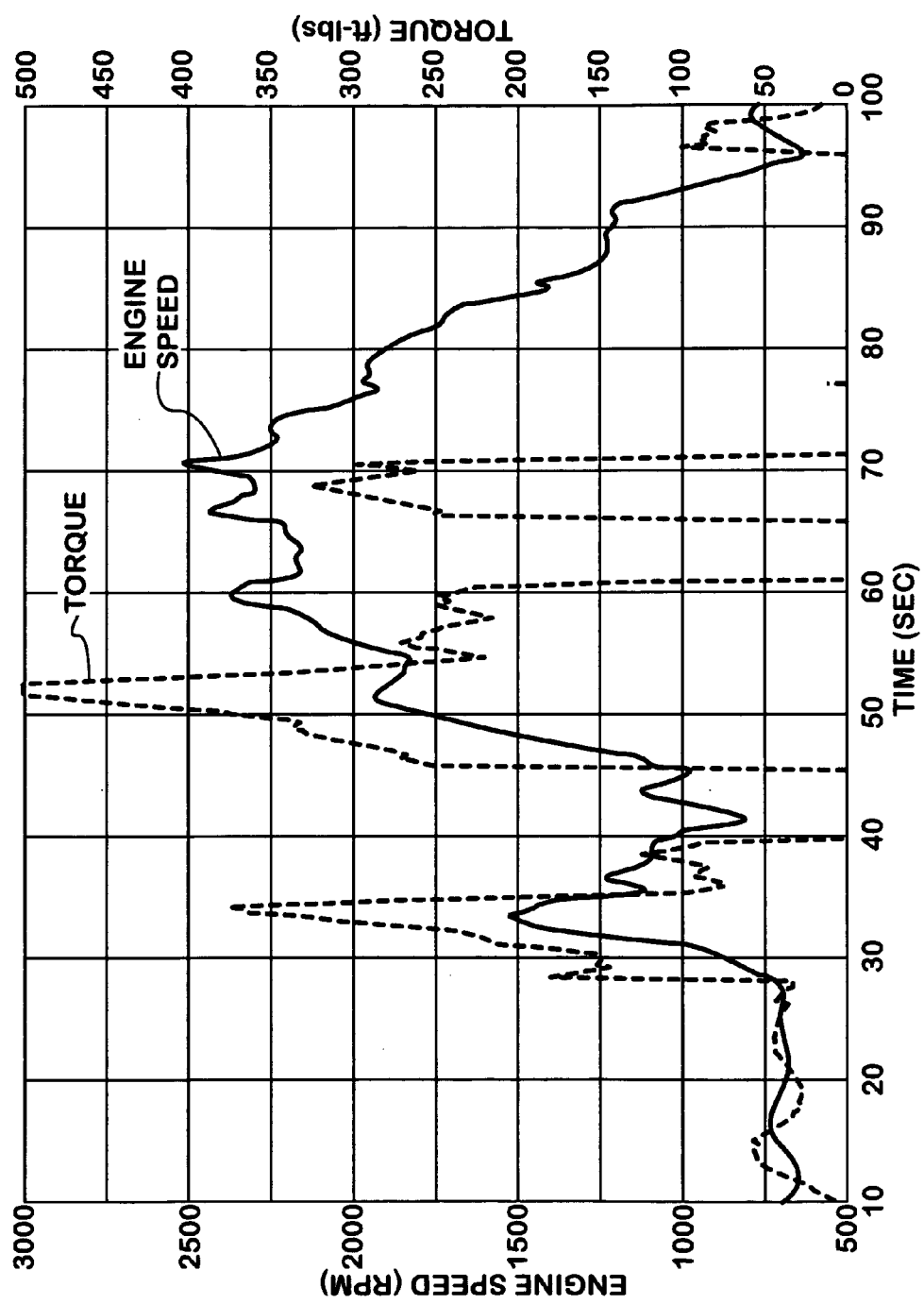
FIG. 4 is another graph showing several other time traces correlated in time with those of FIG. 3.

FIGS. 3 and 4 show the effect of incorporating maps 34 and 40 in an engine. FIG. 3 shows times traces of APS, APS_d, and smoke. FIG. 4 shows time traces of engine speed and torque. When the accelerator pedal is suddenly depressed, torque is promptly increased. While some smoke spikes are generated when the accelerator pedal is depressed while the engine is running a lower speeds, those spikes have peak opacities considerably less than 50% and they are of relative short duration. When the accelerator pedal is depressed while the engine is running higher speeds, little smoke is generated.

While a presently preferred embodiment of the invention has been illustrated and described, it should be appreciated that principles of the invention apply to all embodiments falling within the scope of the following claims.

What is claimed is:

1. An internal combustion engine comprising:
   a control system comprising a processor for processing various data to develop data for control of various aspects of engine operation, including controlling a device that controls flow of a gaseous fluid into the engine;
   wherein a) the processor processes certain data according to a transient compensation strategy to develop a multiplier data value for transient compensation of a control data value for controlling the device by multiplying that control data value by that multiplier data value, b) the transient compensation strategy comprises a map containing data values for the multiplier, each of which is correlated with both a particular data value for engine speed within a particular range of data values for engine speed and a particular data value for accelerator pedal rate within a particular range of data values for accelerator pedal rate, and c) the processor selects one of the multiplier data values from the map on the basis of a data value for engine speed and of a data value for accelerator pedal rate and then multiplies the control data value for controlling the device by the one selected multiplier data value.

2. An engine as set forth in claim 1 wherein the transient compensation strategy comprises d) at least one further map containing data values for a further multiplier, each of which is correlated with both a particular data value for a first further parameter relevant to transient compensation within a particular range of data values for the first further parameter and a particular data value for a second further parameter relevant to transient compensation within a particular range of data values for the second further parameter, and e) the processor selects one of the data values for the further multiplier from the further map on the basis of a data value for the first further parameter and of a data value for the second further parameter and also multiplies the control data value for controlling the device by the one selected data value for the further multiplier.

3. An engine as set forth in claim 2 wherein each of the data values in the at least one further map is correlated with both a particular data value for rate at which engine speed is changing within a particular range of rates at which engine speed is changing and a particular data value for engine speed.

4. An engine as set forth in claim 2 wherein each of the data values in the at least one further map is correlated with both a particular data value for rate at which engine fueling is changing within a particular range of rates at which engine fueling is changing and a particular data value for engine speed.

5. An engine as set forth in claim 2 wherein the device comprises an EGR valve that controls recirculation of exhaust gas from an exhaust system of the engine to an intake system of the engine.

6. An engine as set forth in claim 2 wherein the device comprises a turbocharger that provides the boost.

7. An engine as set forth in claim 6 wherein the control data value functions as a feed-forward component of a turbocharger control strategy that also includes a feedback component.

8. An engine as set forth in claim 1 wherein the device comprises an EGR valve that controls recirculation of exhaust gas from an exhaust system of the engine to an intake system of the engine.

9. An engine as set forth in claim 1 wherein the device comprises a turbocharger that provides the boost.

10. An engine as set forth in claim 9 wherein the control data value functions as a feed-forward component of a turbocharger control strategy that also includes a feedback component.

11. A method for transient control of a device that controls flow of a gaseous fluid into an internal combustion engine, the method comprising:
  processing various data to develop data for control of the device including a) processing certain data according to a transient compensation strategy to develop a multiplier data value for transient compensation of a control data value for controlling the device by multiplying that control data value by that multiplier data value, b) providing the transient compensation strategy with a map containing data values for the multiplier, each of which is correlated with both a particular data value for engine speed within a particular range of data values for engine speed and a particular data value for accelerator pedal rate within a particular range of data values for accelerator pedal rate, and c) selecting one of the multiplier data values from the map on the basis of a data value for engine speed and of a data value for accelerator pedal rate and then multiplying the control data value for controlling the device by the one selected multiplier data value.

12. A method as set forth in claim 11 comprising d) providing the transient compensation strategy with at least one further map containing data values for a further multiplier, each of which is correlated with both a particular data value for a first further parameter relevant to transient compensation within a particular range of data values for the first further parameter and a particular data value for a second further parameter relevant to transient compensation within a particular range of data values for the second further parameter, and e) selecting one of the data values for the further multiplier from the further map on the basis of a data value for the first further parameter and of a data value for the second further parameter and further multiplying the control data value for controlling the device by the one selected data value for the further multiplier.

13. A method as set forth in claim 12 including correlating each of the data values in the at least one further map with both a particular data value for rate at which engine speed is changing within a particular range of rates at which engine speed is changing and a particular data value for engine speed.

14. A method as set forth in claim 12 including correlating each of the data values in the at least one further map with both a particular data value for rate at which engine fueling is changing within a particular range of rates at which engine fueling is changing and a particular data value for engine speed.

15. A method as set forth in claim 12 wherein the device comprises an EGR valve and the product of the control data value for controlling the device and the one selected multiplier data value is used in control of the EGR valve to control recirculation of exhaust gas from an exhaust system of the engine to an intake system of the engine.

16. A method as set forth in claim 12 wherein the device comprises a turbocharger that provides the boost and the product of the control data value for controlling the device and the one selected multiplier data value is used in control of the turbocharger to control boost in an intake system of the engine.

17. A method as set forth in claim 16 wherein the control data value is used as a feed-forward component of a turbocharger control strategy that also includes a feedback component.

18. A method as set forth in claim 11 wherein the device comprises an EGR valve and the product of the control data value for controlling the device and the one selected multiplier data value is used in control of the EGR valve to control recirculation of exhaust gas from an exhaust system of the engine to an intake system of the engine.

19. A method as set forth in claim 11 wherein the device comprises a turbocharger that provides the boost and the product of the control data value for controlling the device and the one selected multiplier data value is used in control of the turbocharger to control boost in an intake system of the engine.

20. A method as set forth in claim 19 wherein the control data value is used as a feed-forward component of a turbocharger control strategy that also includes a feedback component.

21. A control system for an internal combustion engine comprising:
- a processor for processing various data to develop data for control of various aspects of engine operation, including control of a device that controls flow of a gaseous fluid into the engine;
- wherein a) the processor comprises a transient compensation strategy for developing a multiplier data value for transient compensation of a control data value for controlling the device by multiplying that control data value by that multiplier data value, b) the transient compensation strategy comprises a map containing data values for the multiplier, each of which is correlated with both a particular data value for engine speed within a particular range of data values for engine speed and a particular data value for accelerator pedal rate within a particular range of data values for accelerator pedal rate, and c) the processor is programmed to select one of the multiplier data values from the map on the basis of a data value for engine speed and of a data value for accelerator pedal rate and then to multiply the control data value for controlling the device by the one selected multiplier data value.

22. A control system as set forth in claim 21 wherein the transient compensation strategy comprises d) at least one further map containing data values for a further multiplier, each of which is correlated with both a particular data value for a first further parameter relevant to transient compensation within a particular range of data values for the first further parameter and a particular data value for a second further parameter relevant to transient compensation within a particular range of data values for the second further parameter, and e) the processor is programmed to select one of the data values for the further multiplier from the further map on the basis of a data value for the first further parameter and of a data value for the second further parameter and also multiplies the control data value for controlling the device by the one selected data value for the further multiplier.

23. A control system as set forth in claim 22 wherein each of the data values in the at least one further map is correlated with both a particular data value for rate at which engine speed is changing within a particular range of rates at which engine speed is changing and a particular data value for engine speed.

24. A control system as set forth in claim 22 wherein each of the data values in the at least one further map is correlated with both a particular data value for rate at which engine fueling is changing within a particular range of rates at which engine fueling is changing and a particular data value for engine speed.

* * * * *